(12) United States Patent
Tuttle

(10) Patent No.: US 8,400,269 B2
(45) Date of Patent: *Mar. 19, 2013

(54) METHODS AND SYSTEMS USING POLARIZATION MODULATED ELECTROMAGNETIC WAVES

(75) Inventor: John R Tuttle, Boulder, CO (US)

(73) Assignee: Round Rock Research, LLC, Mt. Kisco, NY (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/847,383

(22) Filed: Aug. 30, 2007

(65) Prior Publication Data

US 2009/0058657 A1 Mar. 5, 2009

(51) Int. Cl.
*H04Q 5/22* (2006.01)

(52) U.S. Cl. .... 340/10.1; 340/500; 340/540; 340/568.1; 340/572.1; 340/572.7

(58) Field of Classification Search ................ 340/572.7
See application file for complete search history.

(56) References Cited

U.S. PATENT DOCUMENTS

| | | | |
|---|---|---|---|
| 5,528,222 A | 6/1996 | Moskowitz et al. | |
| 5,777,581 A * | 7/1998 | Lilly et al. | 343/700 MS |
| 6,750,771 B1 * | 6/2004 | Brand | 340/572.7 |
| 7,773,035 B2 * | 8/2010 | Murata et al. | 343/700 MS |
| 2003/0174099 A1 * | 9/2003 | Bauer et al. | 343/893 |
| 2005/0280504 A1 * | 12/2005 | Pettus | 340/10.1 |
| 2006/0007044 A1 * | 1/2006 | Crouch et al. | 343/700 MS |
| 2007/0152831 A1 * | 7/2007 | Eisele | 340/572.7 |
| 2008/0122581 A1 * | 5/2008 | Bae et al. | 340/10.2 |
| 2008/0159364 A1 * | 7/2008 | Rofougaran | 375/219 |
| 2008/0180222 A1 * | 7/2008 | Hollister et al. | 340/10.3 |

OTHER PUBLICATIONS

Johnson, et al., "Data Transmission via Polarization Modulation of a 2.4 Ghz Circularly Polarized Radio Wave," Students of Advanced Laboratory, Dept of Physics, UMR.

* cited by examiner

*Primary Examiner* — Benjamin C Lee
*Assistant Examiner* — Curtis King
(74) *Attorney, Agent, or Firm* — Lerner, David, Littenberg, Krumholz & Mentlik, LLP

(57) ABSTRACT

Methods and systems using polarization modulated electromagnetic waves. At least some of the illustrative embodiments are systems comprising a radio frequency identification (RFID) reader, and a RFID tag (the RFID tag communicatively coupled to the RFID reader),. The RFID tag is configured to transmit data to the RFID reader with data encoded in polarization of electromagnetic waves transmitted from the RFID tag.

23 Claims, 6 Drawing Sheets

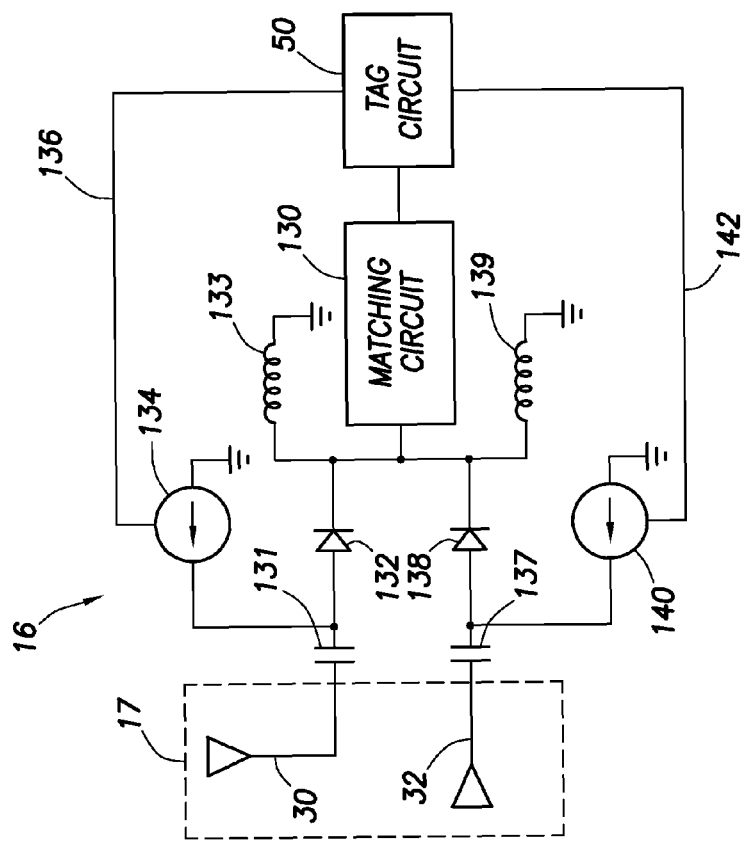
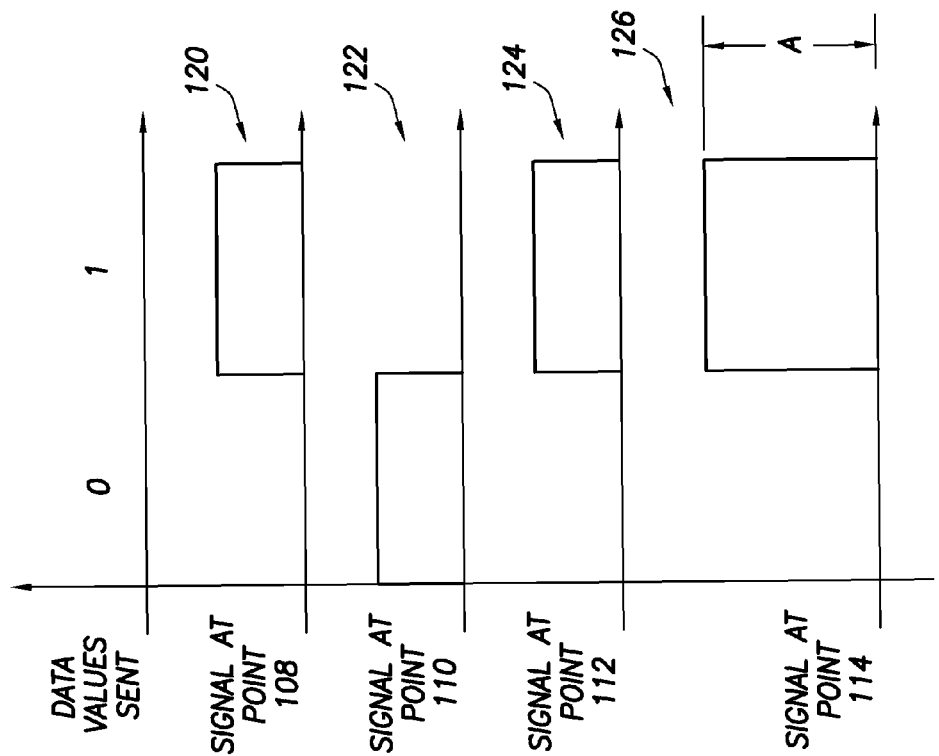
*FIG. 8*
*FIG. 7*

METHODS AND SYSTEMS USING POLARIZATION MODULATED ELECTROMAGNETIC WAVES

FIELD

At least some of the various embodiments are directed to transmitting data between devices using polarization modulation of electromagnetic waves or signals.

DESCRIPTION OF THE RELATED ART

Radio frequency identification (RFID) tags communicate binary data to RFID readers using on-off signaling or modulation. For example, when a RFID tag transmits to the RFID reader the transmission of power may be considered a one, and the RFID tag not transmitting may be considered a zero. While on-off modulation may make RFID tag design relatively simple, and likewise may make RFID reader design relatively simple, the data transmission rate and communication range are limited. The range limitation is particularly prevalent when the RFID tag "transmits" in the form of back-scattered electromagnetic signals. Any mechanism which increases the data transmission rate and/or range would be desirable.

BRIEF DESCRIPTION OF THE DRAWINGS

For a detailed description of various embodiments, reference will now be made to the accompanying drawings in which:

FIG. 7 shows various signal in accordance with embodiments of the FIG. 6;

FIG. 8 shows an RFID tag in accordance with some embodiments;

NOTATION AND NOMENCLATURE

Certain terms are used throughout the following description and claims to refer to particular system components. As one skilled in the art will appreciate, design and manufacturing companies may refer to the same component by different names. This document does not intend to distinguish between components that differ in name but not function. In the following discussion and in the claims, the terms "including" and "comprising" are used in an open-ended fashion, and thus should be interpreted to mean "including, but not limited to . . . ."

Also, the term "couple" or "couples" is intended to mean either an indirect or direct connection. Thus, if a first device couples to a second device, that connection may be through a direct connection or through an indirect connection via other intermediate devices and connections. Moreover, the term "system" means "one or more components" combined together. Thus, a system can comprise an "entire system," "subsystems" within the system, a single antenna with multiple feed points, a group of individual antennas, a radio frequency identification (RFID) tag, a RFID reader, or any other device comprising one or more components.

In the specification and in the claims, using "different" or "differing" electric field polarization means that at least two or more electric field polarizations may be used. The fact that two or more polarizations may have fleeting similarities does not obviate that differing polarizations are used. For example, a vertically polarized electromagnetic wave is considered for this specification and claims to have a differing electric field polarization from a circularly polarized electromagnetic wave even though twice per wavelength the circularly polarized electromagnetic have has a fleeting vertical electric field polarization. Similarly, a right-circularly polarized electromagnetic wave, for purposes of this disclosure and claims, has a differing electric field polarization than a left-circularly polarized electromagnetic wave.

DETAILED DESCRIPTION OF DISCLOSED EMBODIMENTS

Figure 1:
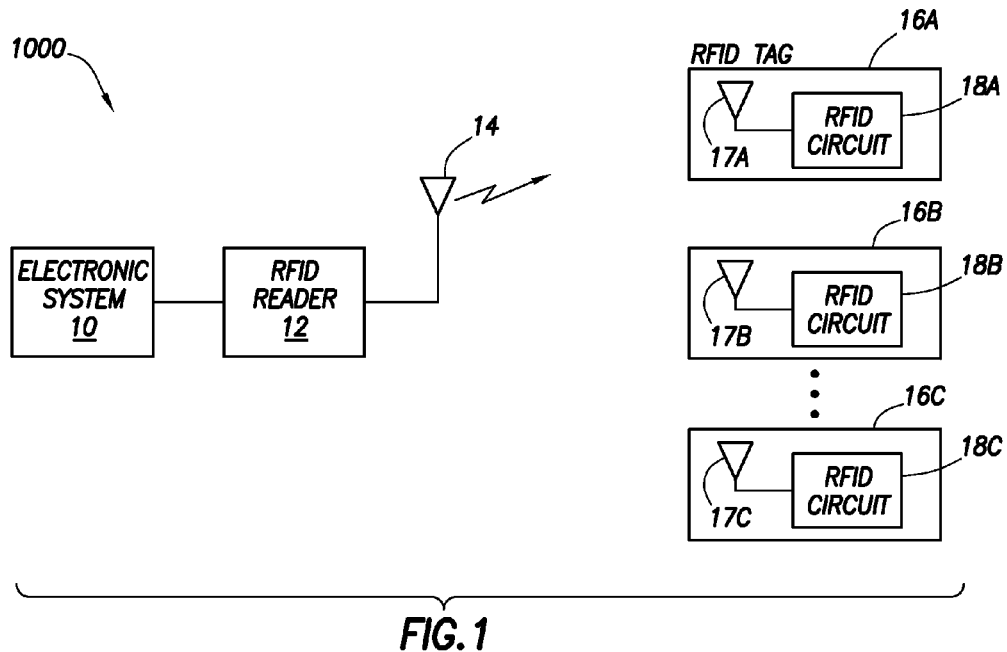
FIG. 1 shows a radio frequency identification (RFID) system in accordance with at least some embodiments.

FIG. 1 illustrates a system 1000 in accordance with at least some embodiments. In particular, system 1000 comprises an electronic system 10 (e.g. a computer system) coupled to a radio frequency identification (RFID) reader 12. The RFID reader 12 may be equivalently referred as an interrogator. By way of antenna system 14, the RFID reader 12 communicates with one or more RFID tags 16A-16C proximate to the RFID reader (i.e., within communication range). The RFID reader 12 may be placed in operational relationship with the RFID tags 16 in many ways. For example, in some embodiments, the RFID reader 12 and/or antenna 14 may be associated with a doorway or portal through which the RFID tags 16 and underlying attached objects travel. In other embodiments, the RFID reader 12 and/or antenna 14 may be associated with a portable device configured to be carried to be proximate to the RFID tags 16.

Considering a single RFID tag 16A (but the description equally applicable to all the RFID tags 16A-16C), RFID tag 16A comprises a tag antenna system 17A which couples to an RFID circuit 18A. The RFID circuit 18A implements in hardware (or a combination of hardware and software) various state machines, microprocessors, logic or other circuits to enable the RFID circuit 18A to receive signals from the RFID reader 12, and to respond to those signals in accordance with the various embodiments.

A communication sent by the RFID reader 12 is received by tag antenna system 17A, and passed to the RFID circuit 18A. In response to the communication, the RFID circuit 18 transmits to the RFID reader 12 the response (e.g. the electronic product code, user defined data and kill passwords) using the tag antenna system 17A. The RFID reader 12 passes data obtained from the various RFID tags 16 to the electronic system 10, which performs any suitable function. For example, the electronic system 10 may be configured to track the RFID tags in accordance with an inventory management process.

There are several types of RFID tags operable in the illustrative system 1000. For example, RFID tags may be active tags, meaning each RFID tag comprises its own internal battery or other power source. Using power from the internal power source, an active RFID tag monitors for interrogating signals from the RFID reader 12. When an interrogating signal directed to the RFID tag is sensed, the tag response may be tag-radiated electromagnetic waves using power from the internal battery or power source. A semi-active tag may likewise have its own internal battery or power source, but a semi-active tag remains dormant (i.e., powered-off or in a low power state) most of the time. When an antenna system of a semi-active tag receives an interrogating signal, the power received is used to activate the semi-active tag, and a response (if any) comprising an identification value is sent by electromagnetic wave backscatter from the tag antenna, with the semi-active tag using power for internal operations from its internal battery or power source. In particular, the RFID reader 12 continues to transmit electromagnetic waves after the RFID tag is awake. While the RFID reader 12 transmits the tuning of the tag antenna system 17 is manipulated. When tuned (and with respect to a particular electric field polarization (hereinafter just polarization)), significant incident power is absorbed by the tag antenna system 17. When de-tuned (with respect to the particular polarization), significant power is reflected by the tag antenna system 17 to the antenna system 14 of the RFID reader 12. In accordance with the various embodiments, the data value modulates the turning to form the reflected or backscattered electromagnetic waves. The RFID reader 12 reads the data or identification value from the backscattered electromagnetic waves. Thus, in this specification and in the claims, the terms "transmitting" and "transmission" include not only sending from an antenna system using internally sourced power, but also sending in the form of backscattered signals.

A third type of RFID tag is a passive tag, which, unlike active and semi-active RFID tags, has no internal battery or power source. The tag antenna system 17 of the passive RFID tag receives an interrogating signal from the RFID reader, and the power extracted from the received interrogating signal is used to power the tag. Once powered or "awake," the passive RFID tag may accept a command, transmit a response comprising a data or identification value, or both; however, like the semi-active tag the passive tag sends the response in the form of RF backscatter.

Figure 2:
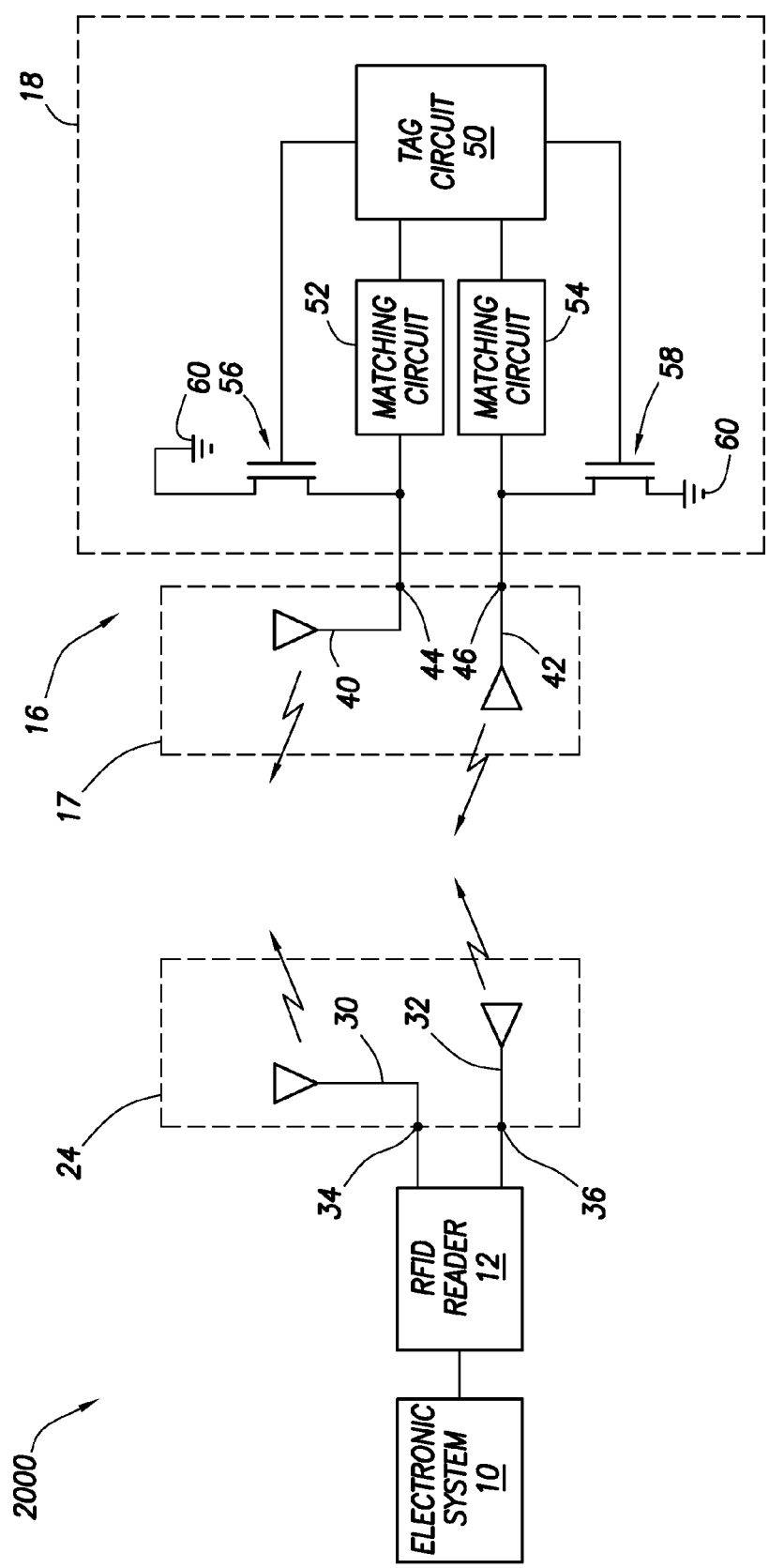
FIG. 2 shows a more detailed system in accordance with at least some embodiments.

FIG. 2 shows a more detailed system 2000 in accordance with some embodiments. In particular, FIG. 2 shows the RFID reader 12 coupled to the reading antenna system 24. Reading antenna system 24 in accordance with at least some embodiments has the ability to transmit and receive electromagnetic waves in a plurality of polarizations. To illustrate the ability to transmit and receive in a plurality polarizations, in FIG. 2 the reading antenna system 24 is illustrated as two antennas 30 and 32. Antenna 30 is schematically shown upright to signify polarization associated with a first feed point (e.g. feed point 34 which, when used, may transmit or receive electromagnetic waves having an illustrative vertical polarization). Likewise, antenna 32 is shown prone to signify polarization associated with a second feed point (e.g. feed point 36 which, when used, may transmit or receive electromagnetic waves having an illustrative horizontal polarization). The reading antenna system may be multiple individual antennas as shown (with each antenna having a feed point), or the reading antenna system may be a single antenna having multiple feed points (e.g. a patch antenna) where each feed point (or group of feed points) is associated with a different polarization. Moreover, while only two antennas 30 and 32 illustrative of two polarizations are shown in FIG. 2, more than two polarizations are contemplated in other embodiments.

Regardless of the type of RFID tag used in the system (i.e., active, semi-active or passive), the RFID reader 12 initiates communication by transmission of an interrogating electromagnetic wave or interrogating signal. For systems using active tags, the interrogating electromagnetic wave has a relatively short duration, and then ceases so that the active tag may transmit using power from a power source internal to the RFID tag. For semi-active and passive tags, however, the interrogating electromagnetic wave continues so that communication in the form of backscattered electromagnetic waves may take place. In accordance with at least some embodiments, an interrogating electromagnetic wave is sent having a single polarization (e.g. sent from illustrative antenna 30 or antenna 32). For example, in systems using active tags, an interrogating electromagnetic signal of a single polarization may be sufficient to alert the active RFID tags of an upcoming transmission or to arm the active RFID tags to transmit internal data. In other embodiments, the RFID reader sends interrogating electromagnetic waves having multiple polarizations. For example, in systems using semi-active or passive RFID tags, sending interrogating electromagnetic waves of multiple polarizations may better ensure that the RFID tags are activated and/or, in the case of passive tags, supplied enough power to operate.

FIG. 2 also shows a RFID tag 16 in accordance with some embodiments. In particular, the RFID tag 16 comprises a RFID circuit 18 coupled to a tag antenna system 17. Tag antenna system 17 in accordance with at least some embodiments has the ability to transmit and receive electromagnetic waves with a plurality of polarizations. To illustrate the ability to transmit and receive in a plurality of polarizations, in FIG. 2 the tag antenna system 17 is illustrated as two antennas 40 and 42. Antenna 40 is schematically shown upright to signify polarization associated with a first feed point (e.g. feed point 44 which, when used, may transmit or receive electromagnetic waves having an illustrative vertical polarization). Likewise, antenna 42 is shown prone to signify polarization associated with a second feed point (e.g. feed point 46 which, when used, may transmit or receive electromagnetic waves having an illustrative horizontal polarization). The tag antenna system 17 may be multiple individual antennas as shown (with each antenna having a feed point), or the tag antenna system 17 may be a single antenna having multiple feed points (e.g. a patch antenna) where each feed point (or group of feed points) is associated with a different polarization. Moreover, while only two antennas 40 and 42 are shown in FIG. 2, more than two polarizations are contemplated in other embodiments.

The RFID circuit 18 comprises a tag circuit 50, which tag circuit comprises various state machines and memory to implement the functionality of the RFID tag 16. The tag circuit 50 couples to each feed point 44, 46 though matching circuits 52, 54 respectively. As the name implies, the matching circuits 52, 54 provide impedance matching for antenna signals between the respective feed points and the matching circuits. In other embodiments, the matching circuits may be omitted, or the impedance matching provided may be sub-optimal (e.g. the "matching circuits" being only a diode and a capacitor) in order to make the RFID tag 16 less complex and thus cheaper to manufacture.

The RFID tag 16 further comprises a plurality of shorting devices, such as a switch 56 coupled between the antenna 40 and the matching circuit 52, and switch 58 coupled between the antenna 42 and matching circuit 54. The switches 56, 58 are illustrated as Field Effect Transistors (FETs), but the switches may be any device capable of operating as a switch (e.g., junction transistors, a triode for alternating current (TRIAC) or Varactor diode). The switches 56, 58 are configured to selectively couple their respective antennas to an electrical common or electrical ground 60 (hereinafter just ground 60) of the tag circuit 50. In particular, when the RFID tag 16 is communicating to the RFID reader in the form of backscattered radio frequency signals, the tag circuit 50 selectively tunes and de-tunes the tag antenna system 17 by selectively coupling (in some embodiments mutually exclusively) each of the illustrative antennas 40, 42 to the ground 60 through the switches 56, 68 respectively. In some embodiments, the impedance matching circuits 52, 54, tag circuit 50 and switches 56, 58 are all manufactured to engage the same substrate, yet in other embodiments the impedance matching circuits 52, 54, tag circuit 50 and/or and switches 56, 58 are individual components electrically coupled together.

Consider antenna 40, switch 56 and matching circuit 52. When switch 56 is not conducting (opened), antenna 40 is thus coupled to matching circuit 52. Any electromagnetic waves having the proper frequency and having polarization at least partially aligned (i e., vertical in this example) with antenna 40 are at least partially absorbed, and power is transferred to the matching circuit. By contrast, when switch 56 is conducting (shorted), the matching circuit 52 is effectively disconnected and antenna 40 is grounded at its feed point 44, thereby de-tuning antenna 40. Any electromagnetic waves having the proper frequency and having polarization at least partially aligned with antenna 40 are at least partially reflected by the de-tuned antenna 40, and substantially no power is transferred to the matching circuit 52. Antenna 42, switch 58 and matching circuit 54 operate similarly with respect to electromagnetic waves of the illustrative horizontal polarization.

Figure 3:
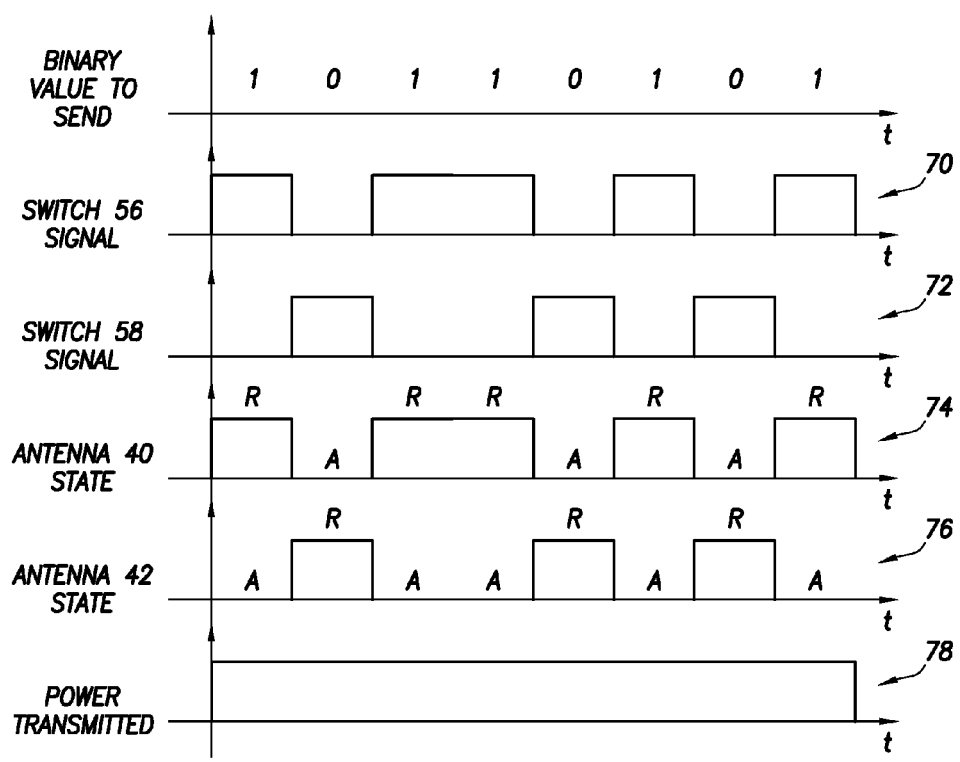
FIG. 3 shows various signals in accordance with at least some embodiments.

In accordance with at least some embodiments, data communication from the RFID tag 16 to the RFID reader 12 is encoded in polarization of electromagnetic waves transmitted from the RFID tag 16, which may also be referred to as polarization modulation. As an example, consider that the RFID tag 16 is a semi-active or passive tag, and that after receiving the interrogating electromagnetic wave the RFID tag sends the following series of binary values: [10110101]. In accordance with at least some embodiments, data values are encoded as a particular polarization of transmitted electromagnetic wave. For example, binary value "1" may be represented as transmission of a vertically polarized electromagnetic signal, and binary value "0" may be represented as transmission of a horizontally polarized electromagnetic signal. FIG. 3 illustrates a plurality of signals related to the illustrative binary values [10110101] to be transmitted by the RFID tag 16. In particular, FIG. 3 illustrates the binary values, and in corresponding time frames the signals applied to the switch 56 (signals 70) and the signals applied to the switch 58 (signals 72). During periods of time when a binary value "1" is to be transmitted, the switch 56 signal (from the tag circuit 50) is asserted, and the switch 58 signal (again from the tag circuit 50) is de-asserted. In this illustrative configuration, the antenna 40 is shorted to ground (de-tuned), and is thus reflective, as illustrated by signals 74 ("R" referring to a de-tuned and thus reflective state). Likewise in this illustrative configuration, the antenna 42 is coupled to matching circuit 54, and is thus absorptive, as illustrated by signals 76 ("A" referring to a tuned and thus absorptive). During periods of time when a binary value "0" is to be transmitted, the switch 56 signal is de-asserted, and the switch 58 signal is asserted. In this illustrative configuration, the antenna 42 is shorted to ground (de-tuned), and is thus reflective, as illustrated by signals 76. Likewise, the antenna 40 is coupled to matching circuit 52, and is thus absorptive, as illustrated by signals 74.

In the case of RFID tag 16 being an active tag, the illustrative vertically and horizontally orientated electromagnetic waves are derived from power internal to the RFID tag. Thus, for the configuration of the RFID tag in FIG. 2, the switches 56, 58 and corresponding switch signals are not needed. The tag circuit merely drives the appropriate antenna of the antenna system 17 at the appropriate time.

An interesting characteristic to note regarding encoding data in polarization of electromagnetic waves transmitted from the RFID tag 16 is shown by signal 78. In particular, the power transmitted from the RFID tag 16 (whether derived from an internal power source or as a backscatter) is relative constant. Having relatively constant power transmitted from the RFID tag may mean that the data rate of binary values transmitted from the tag may be increased and/or the range over which communications from the RFID tag to RFID reader may take place may be increased.

Figure 4:
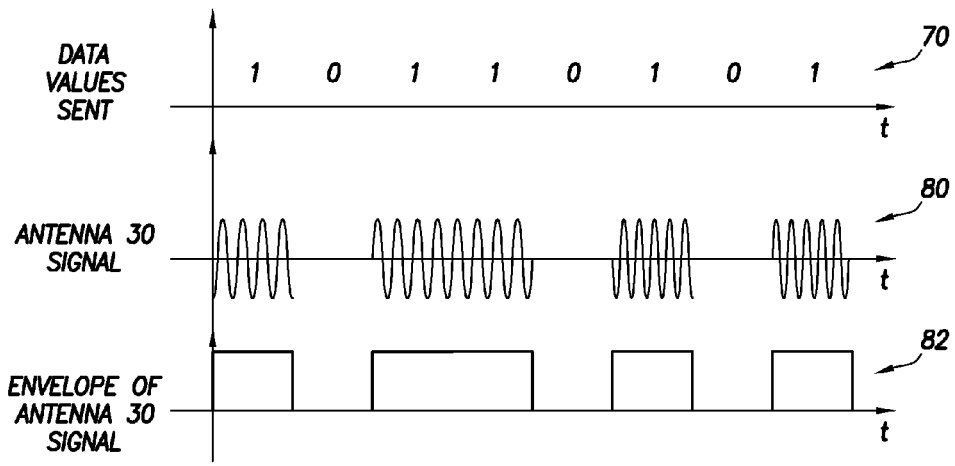
FIG. 4 shows various signals in accordance with at least some embodiments.

In some embodiments the physical orientation of the RFID tag 16 relative to the reading antenna system 24 is fixed. In such embodiments, the relationship of a particular polarization to a data value is known by the RFID reader. Consider a situation where the physical orientation of the RFID tag 16 to the reading antenna 24 is fixed and the relationship of polarization is that data value "1" is a vertically polarized electromagnetic wave and that data value "0" is a horizontally polarized electromagnetic wave. The RFID reader may obtain the data transmitted from the RFID tag by decoding only one of the signals obtained from a feed point. FIG. 4 illustrates the binary data values sent (signals 70), as well as the signal 80 associated with illustrative antenna 30 (the signal emanating from feed point 34). Using an envelope detector (e.g. applying the signal to a diode and a resistive-capacitive (RC) circuit), the envelope of the signals 80 may be extracted by the RFID reader 12, resulting in signals 82 which are (in this illustrative case) directly indicative of the data values 70. Similarly, the signals associated with illustrative antenna 32 alone may be decoded to reveal the data values.

Figure 5:
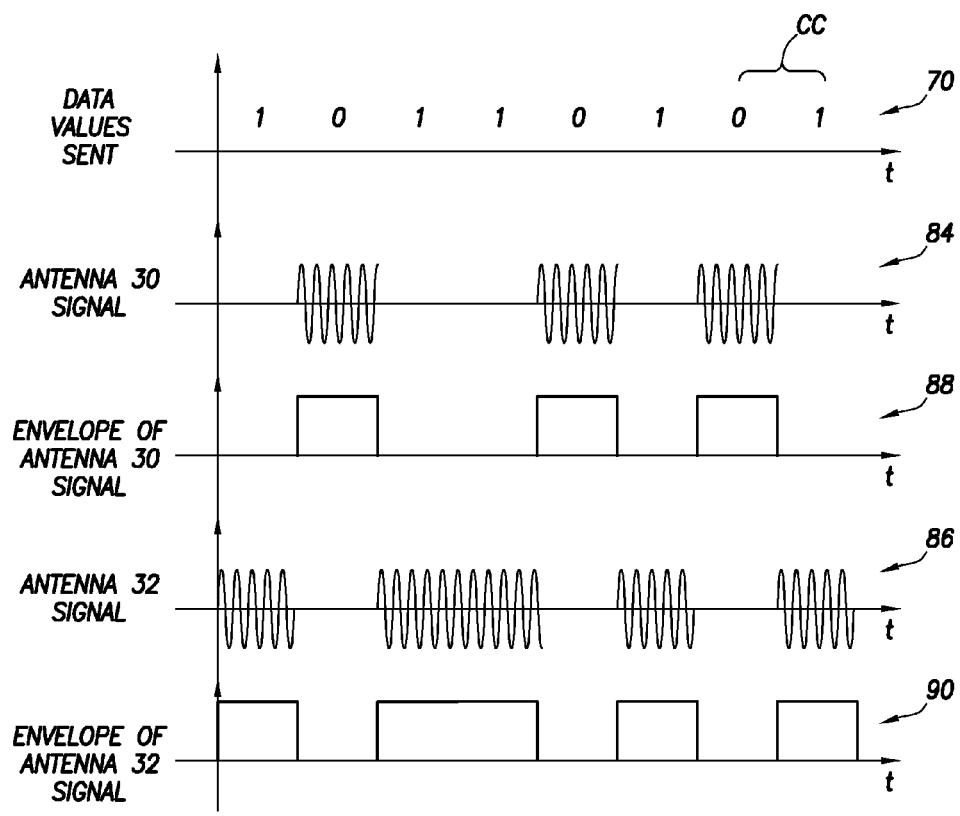
FIG. 5 shows various signals in accordance with at least some embodiments.

In yet still other embodiments, the physical orientation of the RFID tag 16 relative to the reading antenna system 24 may be subject to change. In such embodiments, the relationship of a particular polarization to a data value may likewise be subject to change. Referring again to FIG. 2, consider a situation where the RFID tag 16 encodes a data value "1" by transmitting from illustrative antenna 40, and encodes a data value "0" by transmitting from illustrative antenna 42, but that tag antenna system 17 is rotated 90 degrees with respect to reading antenna system 24. The polarization of each of the illustrative antennas in the tag antenna system 17 is dependent upon the physical orientation of the RFID tag 16, and the orientation is unknown to the RFID reader in this example. Decoding the data values transmitted from the RFID tag 16 in situations where the orientation is unknown may take many forms. In some embodiments, a signal associated with each polarization of the reading antenna system 24 may be considered individually, with the signal ultimately selected as the viable signal based on check codes transmitted along with the data. To illustrate these embodiments, FIG. 5 shows the binary data values sent (signals 70), except in this case consider that the last two digits are part of a check code (CC) (e.g., cyclic redundancy check code). FIG. 5 further shows the signal 84 associated with illustrative antenna 30 (the signal emanating from feed point 34) and the signal 86 associated with illustrative antenna 32 (the signal emanating from feed point 36). Using an envelope detector (e.g. applying the signal to a diode and RC circuit), the envelope of the signals 84 may be extracted by the RFID reader 12, resulting in signals 88. Similarly, using an envelope detector the envelope of the signals 86 may be extracted by the RFID reader 12, resulting in signals 90.

Using the envelope of signals 88 (associated with antenna 30), the RFID reader attempts to apply the extracted data to the check codes. If the extracted data matches the check codes, then the RFID reader may refrain from checking, or disregard, the signals 86 (associated with antenna 32). On the other hand, if the extracted data does not match the check codes because of an inversion related to orientation of the antenna systems, the RFID reader may then use the envelope of signals 90 (associated with antenna 32), and attempt to apply the extracted data to the check codes. If the extracted data and check codes of signals 90 match, then the overall data has been recovered, and no further processing is needed.

It is possible, however, that electromagnetic waves associated with the "correct" orientation of the antenna systems becomes corrupted, and thus neither set of envelope signals produces extracted data that matches the check codes (that is, the properly aligned signal is corrupted, and the other signal produces logically inverted values because of the orientation). Thus, in other embodiments (e.g. where use of check codes fails to reveal good data), the signals 88, 90 may be logically inverted, and application of the extracted data to the check codes for the signals 88, 90 applied again in an attempt to finding matching extracted data and check codes. Moreover, the check codes may also comprise error correction codes (ECC) that not only allow checking for uncorrupted data, but also limited data error recovery.

Figure 6:
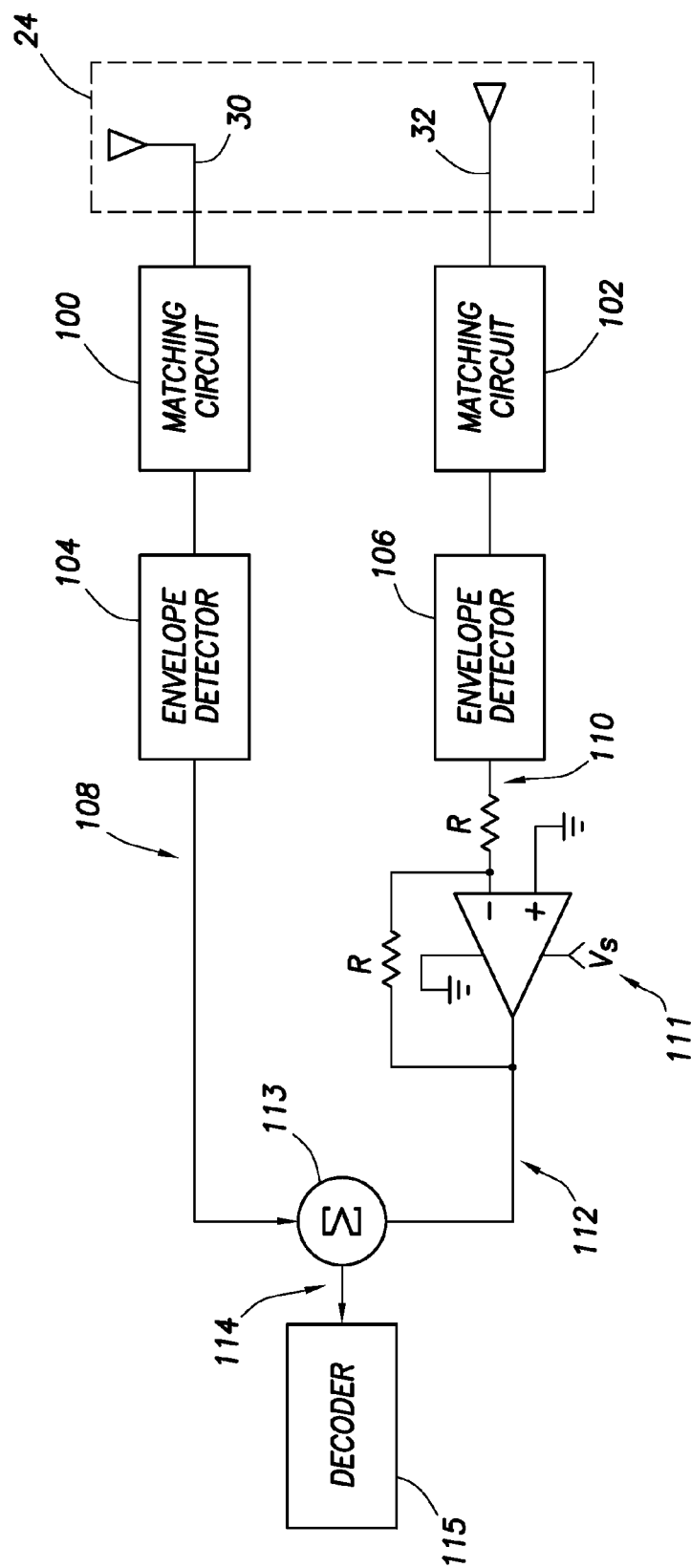
FIG. 6 shows a block diagram of decoding/demodulating in accordance with at least some embodiments.

The various embodiments of attempting to extract the data by the RFID reader 12 described to this point focus on the signals received by the reading antenna system 24 individually. However, in other embodiments the decoding considers the signals together in an attempt to extract data from the transmission from the RFID tag. FIG. 6 is a block diagram that logically illustrates considering the electromagnetic signals together when decoding the data transmitted by an RFID tag 16. In some embodiments, the various blocks and functions illustrated in FIG. 6 are performed by individual electronic components (e.g. discrete electronics, or an application specific integrated circuit). In other embodiments, the various blocks and functions are performed by software in a digital signal processor. Illustrative antenna 30 couples to a matching circuit 100, and likewise illustrative antenna 32 couples to a matching circuit 102. Electromagnetic waves incident upon and having at least partial polarization alignment with the illustrative antenna 30 produce electromagnetic signals that enter the envelop detector 104 (which may be, for example, a diode and RC circuit). Likewise, electromagnetic waves incident upon and having at least partial polarization alignment with the illustrative antenna 32 produce electromagnetic signals that enter the envelope detector 106. The signals exiting the envelope detector 106 are applied to the illustrative operational amplifier 111 configured to be an inverting amplifier with unity gain. The operational amplifier 111 logically inverts the signals associated with antenna 32, and then the signals associated with antenna 30 and the inverted signal associated with antenna 32 are fed to a summing unit 113. From there, the decoder circuit 115 attempts to decode the combined signals. Is noted before proceeding that the operational amplifier is merely illustrative of a logical NOT operation. At the frequencies of interest for RIFD systems, operational amplifiers may be impractical, and other devices and systems may be used to perform the logical NOT operation (e.g. transistor configured as an inverting amplifier).

Assuming the illustrative situation with respect to FIG. 2 that a data value "1" is represented by an electromagnetic wave having a polarization aligned with illustrative antenna 30, and that a data value "0" is represented by an electromagnetic wave having a polarization aligned with antenna 32, FIG. 7 shows a plurality of signals associated with the system of FIG. 6. In particular, signals 120 are illustrative of the signals at point 108 (in FIG. 6). Signals 122 are illustrative of the signals at point 110 (in FIG. 6). Signals 124 are illustrative of the signals at point 112 (in FIG. 6), and in particular after inverting unity gain amplifier 111 (logical NOT). Signals 126 are illustrative of the signals at point 114 (in FIG. 6), and in particular after the summer 1 13. As shown by signals 126, the logical inversion of the one of the signals, and then summing the signals together produces a resultant signal having an amplitude that, in some cases, is twice the amplitude of the antenna signals considered alone. Moreover, considering the signals together reinforces the resultant signal (i e., both the logical "0" and logical "1" contribute to asserted signals, and vice-versa).

FIG. 8 shows an active RFID tag 16 in accordance with other embodiments. In particular, the active RFID tag 16 comprises tag antenna system 17, comprising illustrative antennas 30 and 32 as discussed above. Each of the tag antennas 30, 32, however, selectively couple (i.e., may be controllably coupled and de-coupled) to the single matching circuit 130 and then tag circuit 50. Selectively coupling in accordance with these embodiments is enabled by way of diodes and controlled current sources. In particular, illustrative antenna 30 couples to the matching circuit 130 by way of a capacitor 131 and diode 132. When the tag circuit 50 couples the illustrative antenna 30 to the matching circuit 130, the tag circuit 50 enables controllable (in on-off sense) current source 134 by way of signal line 136. The controllable constant current source generates a direct current (DC current) in the direction indicated by the arrow that flows through the diode 132, and then to ground through inductor 133. The current forward biases the diode 132, and antenna signals to be applied to the illustrative antenna 30 from the tag circuit "ride" the DC current of current source 134 through the diode and then across the capacitor 131 (which appears as a short at signal frequencies). Similarly, the tag circuit 50 may selectively couple the illustrative antenna element 32 to the matching circuit by forward biasing the diode 138 using constant current source 140, as controlled over signal line 142. Like the system with respect to antenna 32, the capacitor 137 act to block DC current to the antenna, and inductor 139 shorts the DC current to ground prior to the current entering the matching circuit 130. It is noted that in alternative embodiments the inductors 133 and 139 may be within the matching circuit 130. In yet still other embodiments, the capacitors 131 and 137 may be omitted as each antenna is an open circuit and thus there is no current path through the antenna for the DC current.

Still referring to FIG. 8, transmitting using polarization modulation by the RFID tag 16 in the illustrated embodiments may be based on selectively forward biasing the diodes 132 and 138. In particular, consider the tag circuit 50 generating a sinusoidal antenna feed signal (using power from an internal power source, such as a battery), and applying the feed signal to the matching circuit. In these embodiments the tag circuit may encode the data values by selectively coupling the feed signal to the illustrative antennas 30 and 32 by selectively (e.g. mutually exclusively) forward biasing the diodes 132 and 138. For example, binary value "1" may be encoded as an electromagnetic wave transmitted from illustrative antenna 30, while binary value "0" may be encoded as an electromagnetic wave transmitted from illustrative antenna 32, or vice versa.

The embodiments discussed to this point have been limited to encoding data values in electromagnetic waves having orthogonal polarization. However, the polarization modulation is not limited to just two electromagnetic waves with orthogonal polarization. The polarization of the two or more electromagnetic waves need merely be different to use the polarization modulation. For example, to electromagnetic waves whose polarizations differ by less than 90 degrees (pi radians) may be used. Three or more "straight" (e.g. horizontal, vertical) polarizations may be used. Circular polarizations may be used (e.g., left circularly polarized along with a left circularly polarized), or circular polarization may be used in combination with the "straight" polarizations (e.g. a vertical polarization along with a circular polarization).

Figure 9:
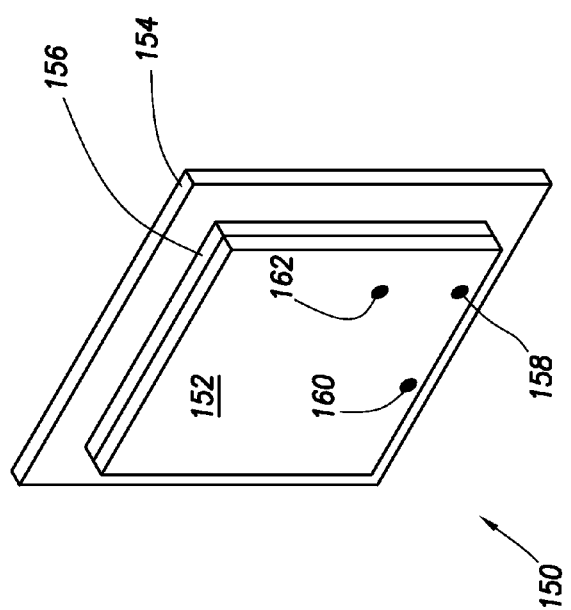
FIG. 9 shows a patch antenna in accordance with some embodiments.

FIG. 9 illustrates a patch antenna 150 that may be the reading antenna system 24 and/or the tag antenna system 17. In particular, the patch antenna 150 comprises an active element 152 separated from a ground plane 154 by way of a dielectric material 156. The patch antenna comprises a plurality of illustrative feed points 158, 160, 162. When feed point 162 is used alone during transmission (reception), the patch antenna 150 creates (receives) an electromagnetic wave with a particular polarization (e.g. horizontal polarization). When feed point 160 is used alone, the patch antenna 150 creates (receives) an electromagnetic wave with a different polarization (e.g. vertical polarization). When feed points 158 and 162 are used together (to the exclusion of feed point 160), the patch antenna 150 creates (receives) an electromagnetic wave with yet another polarization (e.g. circular polarization). Likewise, when feed points 158 and 160 are used together (to the exclusion of feed point 162), the patch antenna 150 creates (receives) an electromagnetic wave with yet still another polarization (e.g. circular polarization, but where the rotational orientation of the polarization is different than that produced when feed points 158 and 162 are used). Thus, a system (such as system 2000 of FIG. 2) may selectively use any polarization that may be transmitted or received by a patch antenna 150 being used as a reading antenna system 24 and or patch antenna system 17.

Figure 10:
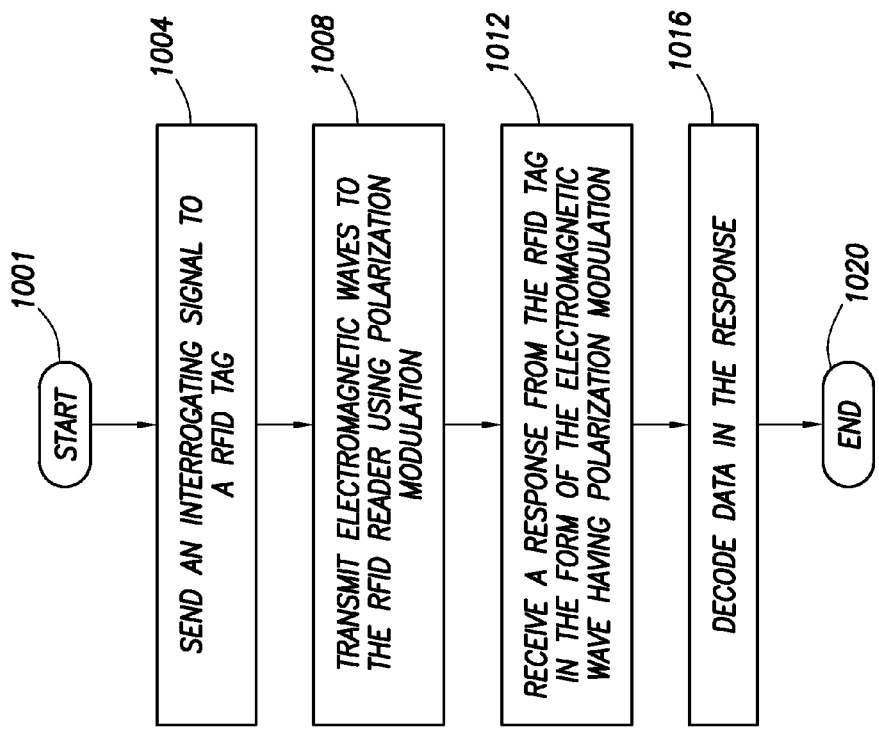
FIG. 10 shows a method in accordance with some embodiments.

FIG. 10 illustrates a method in accordance with at least some embodiments. In particular, the method starts (block 1001), and proceeds to send an interrogating signal to a RFID tag (block 1004). The sending may take many forms. In some embodiments the sending is by way of an electromagnetic signal of a single polarization. In other embodiments, the sending is by way of multiple electromagnetic signals of different polarizations. In some embodiments, the reading antenna system which will receive responses from RFID tags is used to send the interrogating signal, and in other embodiments an antenna system different than that used to receive signals from RFID tags is used to transmit the interrogating signals.

Regardless of the precise mechanism to send the interrogating signal, in response to the interrogating signal the RFID tag transmits electromagnetic waves to the RFID reader using polarization modulation (block 1008). The electromagnetic waves may be in the form of backscattered electromagnetic waves, or the electromagnetic waves may be based on power derived from an internal power source. In some embodiments, the power transmitted by the RFID tag may be substantially constant.

In response to the electromagnetic waves transmitted by the RFID tag, the RFID reader receives a response from the RFID tag in the form the electromagnetic wave having polarization modulation (block 1012). The varying polarizations of the electromagnetic waves produce differing electromagnetic signals on different feed points of the reading antenna. Thereafter, the illustrative method decodes data in the response (block 1016), and the method ends (block 1020). In some embodiments, the signals are considered alone when decoding takes place, and testing whether the decoded data is correct may be based on check codes. In some cases, the orientation of the RFID tag may be determined from the decoding. For example, if the data from a particular feed point is deemed corrected based on an analysis of the check codes that accompany the data, the polarization of the electromagnetic signal that carries a particular data value (e.g., "1" or "0") is determined, and thus the orientation of the RFID tag may be inferred. In yet still other embodiments, rather than considering the signals from the feed points alone, the signals from various feed points are considered together when the decoding takes place.

The above discussion is meant to be illustrative of the principles and various embodiments of the present invention. Numerous variations and modifications will become apparent to those skilled in the art once the above disclosure is fully appreciated. For example, the binary value encoding scheme discussed is a non-return to zero (NRZ) system (each binary value has an assigned physical state (e.g. binary "1" assigned one polarization, and binary "0" assigned another polarization)); however, other encoding systems may be used (e.g. NRZ system where binary "1" is represented as a transition of polarizations, and a binary "0" is represented by a lack of transition of polarization). Moreover, the frequency of the received signals in FIGS. 4 and 5 (signals 80, 84 and 86) is merely illustrative of received AC signals, and is not meant to imply any relationship between the frequencies of the electromagnetic waves and the bit periods for the encoding. It is intended that the following claims be interpreted to embrace all such variations and modifications.

What is claimed is:
1. A system comprising:
a radio frequency identification (RFID) reader; and
an RFID tag communicatively coupled to the RFID reader;
wherein the RFID tag comprises a patch antenna comprising a first feed point, a second feed point and a third feed point,
wherein the RFID tag is configured to transmit binary data bits to the RFID reader, the RFID reader being responsive to a particular combination of the binary data bits received from the RFID tag,
wherein, in the event that the first feed point is active and the second and third feed points are inactive, the binary data bits are encoded in a first electric field polarization of electromagnetic waves transmitted from the RFID tag, a particular magnitude of the first electric field polarization corresponding to a binary zero,
wherein, in the event that the second feed point is active and the first and third feed points are inactive, the binary data bits are encoded in a second electric field polarization of electromagnetic waves transmitted from the RFID tag, a particular magnitude of the second electric field polarization corresponding to a binary one,
wherein, in the event that the first and second feed points are active and the third feed point is inactive, the binary data bits are encoded in a third electric field polarization of electromagnetic waves transmitted from the RFID tag, a particular magnitude of the third electric field polarization corresponding to a binary zero, and
wherein, in the event that the first and third feed points are active and the second feed point is inactive, the binary data bits are encoded in a fourth electric field polarization of electromagnetic waves transmitted from the RFID tag, a particular magnitude of the fourth electric field polarization corresponding to a binary one.

2. The system according to claim 1 wherein the RFID tag is configured to encode the binary data bits in the form of backscattered electromagnetic signals.

3. The system according to claim 1 wherein the RFID tag further comprises:
- a tag antenna system configured to transmit electromagnetic signals having one of the electric field polarizations;
- an RFID circuit; and
- a plurality of diodes coupled one each between the RFID circuit and one of the first, second and third feed points of the patch antenna;
- wherein the RFID circuit is configured to encode the binary data bits by selectively forward biasing at least one of the plurality of diodes.

4. The system according to claim 1 wherein the RFID reader is configured to send interrogating electromagnetic waves to the RFID tag in a plurality of electric field polarizations.

5. The system according to claim 1 wherein the RFID reader is configured to attempt to decode signals from a plurality of feed points, and select a signal based on check codes associated with each transmission from the RFID tag.

6. The system according to claim 1 further comprising an object to which the RFID tag is coupled.

7. The system according to claim 1 wherein the RFID reader is associated with at least one selected from the group consisting of:
- a doorway through which the RFID tags travel; and
- a portable device configured to situate the RFID reader proximate to the RFID tag.

8. The system according to claim 1 wherein the RFID reader is further configured to transmit data obtained from the RFID tag to a host computer, and wherein the host computer is configured to track an item in accordance with an inventory management process.

9. A radio frequency identification (RFID) tag comprising:
- a tag antenna system configured to transmit electromagnetic waves having a plurality of distinct electric field polarizations, wherein the tag antenna system comprises a patch antenna comprising a first feed point, a second feed point and a third feed point; and
- an RFID circuit coupled to the tag antenna system;
- wherein the tag antenna system is configured to transmit binary data bits to an RFID reader, the RFID reader being responsive to a particular combination of the binary data bits received from the RFID tag,
- wherein, in the event that the first feed point is active and the second and third feed points are inactive, the binary data bits are encoded in a first electric field polarization of electromagnetic waves transmitted from the RFID circuit, a particular magnitude of the first electric field polarization corresponding to a binary one,
- wherein, in the event that the second feed point is active and the first and third feed points are inactive, the binary data bits are encoded in a second electric field polarization of electromagnetic waves transmitted from the RFID circuit, a particular magnitude of the second electric field polarization corresponding to a binary zero,
- wherein, in the event that the first and second feed points are active and the third feed point is inactive, the binary data bits are encoded in a third electric field polarization of electromagnetic waves transmitted from the RFID circuit, a particular magnitude of the third electric field polarization corresponding to a binary one, and
- wherein, in the event that the first and third feed points are active and the second feed point is inactive, the binary data bits are encoded in a fourth electric field polarization of electromagnetic waves transmitted from the RFID circuit, a particular magnitude of the fourth electric field polarization corresponding to a binary zero.

10. The RFID tag according to claim 9 further comprising:
- a plurality of diodes coupled one each between one of the first, second and third feed points of the tag antenna system;
- wherein the RFID circuit is configured to transmit the data by selectively forward biasing at least one of the diodes.

11. The RFID tag according to claim 9 wherein the RFID tag transmits the electromagnetic waves in the form of backscattered electromagnetic waves.

12. The RFID tag according to claim 9 further comprising:
- a power source coupled to the RFID circuit;
- wherein the RFID circuit is configured to transmit the data using power from the power source.

13. The RFID tag according to claim 9 wherein the RFID circuit is configured to transmit the electromagnetic waves having a substantially constant transmitted power.

14. A method comprising:
- sending an interrogating signal from an radio frequency identification (RFID) reader to a RFID tag comprising a patch antenna comprising a first feed point, a second feed point and a third feed point; and
- receiving a response at the RFID reader from the RFID tag in the form of an electromagnetic wave comprising binary data bits, wherein a polarization of the received electromagnetic wave is dependent on which feed points of the patch antenna are active, the RFID reader being responsive to a particular combination of the binary data bits received from the RFID tag,
- wherein, in the event that the first feed point is active and the second and third feed points are inactive, the electromagnetic wave has a particular magnitude of a first electric field polarization corresponding to a binary zero,
- wherein, in the event that the second feed point is active and the first and third feed points are inactive, the electromagnetic wave has a particular magnitude of a second electric field polarization corresponding to a binary one,
- wherein, in the event that the first and second feed points are active and the third feed point is inactive, the electromagnetic wave has a particular magnitude of a third electric field polarization corresponding to a binary one, and
- wherein, in the event that the first and third feed points are active and the second feed point is inactive, the electromagnetic wave has a particular magnitude of a fourth electric field polarization corresponding to a binary zero.

15. The method according to claim 14 wherein sending further comprises sending the interrogating signal during the receiving.

16. The method according to claim 14 wherein receiving the response further comprises:
- receiving a plurality of electromagnetic waves, wherein at least some of the electromagnetic waves have different electric field polarizations; and
- decoding data in the response using the plurality of electromagnetic waves.

17. The method according to claim 16 wherein decoding further comprises:
- assuming a relationship of data values to electric field polarizations;
- decoding using the relationship; and
- testing whether the relationship is correct.

18. The method according to claim 17 wherein testing further comprises determining whether check codes in the response are valid.

19. The method according to claim 14 further comprising:
transmitting the response to an electronic system; and
tracking the RFID tag in accordance with an inventory management process.

20. The method according to claim 14 wherein receiving further comprises at least one selected from the group consisting of:
receiving proximate to a portal through which the RFID tag travels; and
receiving by a portable device configured to be positioned proximate to the RFID tag.

21. A system comprising:
an antenna system configured to receive electromagnetic waves, wherein the antenna system comprises a patch antenna comprising a first feed point, a second feed point and a third feed point; and
a radio frequency identification (RFID) reader coupled to the antenna system, wherein the RFID reader is configured to receive binary data bits in the form of electromagnetic waves using the antenna system, the RFID reader being responsive to a particular combination of the binary data bits received from the antenna system,
wherein, in the event that the first feed point is active and the second and third feed points are inactive, the binary data bits are encoded in a first electric field polarization of electromagnetic waves, a particular magnitude of the first electric field polarization corresponding to a binary one,
wherein, in the event that the second feed point is active and the first and third feed points are inactive, the binary data bits are encoded in a second electric field polarization of electromagnetic waves, a particular magnitude of the second electric field polarization corresponding to a binary zero,
wherein, in the event that the first and second feed points are active and the third feed point is inactive, the data is encoded in a third electric field polarization of electromagnetic waves, a particular magnitude of the third electric field polarization corresponding to a binary zero, and
wherein, in the event that the first and third feed points are active and the second feed point is inactive, the data is encoded in a fourth electric field polarization of electromagnetic waves, a particular magnitude of the fourth electric field polarization corresponding to a binary one.

22. The system according to claim 21 wherein the RFID reader receives the electromagnetic waves in the form of backscattered electromagnetic waves.

23. The system according to claim 21 wherein the RFID reader is configured to transmit data to an RFID tag, the data being encoded in one of the electric field polarizations of electromagnetic waves transmitted from the antenna system.

* * * * *